(12) United States Patent
Glaenzer et al.

(10) Patent No.: US 11,513,059 B2
(45) Date of Patent: Nov. 29, 2022

(54) CONTAMINATION SENSOR FOR GAS TURBINE ENGINES

(71) Applicant: Solar Turbines Incorporated, San Diego, CA (US)

(72) Inventors: Noel Glaenzer, Cambridge (GB); Richard Green, Poway, CA (US); Prabhakar Mohan, San Diego, CA (US); Christopher Meyer, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 307 days.

(21) Appl. No.: 16/841,150

(22) Filed: Apr. 6, 2020

(65) Prior Publication Data

US 2021/0310931 A1    Oct. 7, 2021

(51) Int. Cl.
  *G01N 17/04*    (2006.01)
  *G01N 17/00*    (2006.01)
  *F02C 7/00*    (2006.01)

(52) U.S. Cl.
  CPC .............. *G01N 17/04* (2013.01); *F02C 7/00* (2013.01); *G01N 17/006* (2013.01); *F05D 2220/32* (2013.01); *F05D 2260/83* (2013.01)

(58) Field of Classification Search
  CPC ...... G01N 17/04; G01N 17/006; G01N 15/06; G01N 2015/0046; F02C 7/00; F01D 17/08; F01D 17/02

USPC .......................................................... 453/53
See application file for complete search history.

(56) References Cited

U.S. PATENT DOCUMENTS

| | | |
|---|---|---|
| 8,589,087 B2 * | 11/2013 | Martin ................... F01D 17/20 702/34 |
| 9,945,024 B2 | 4/2018 | Ramm et al. |
| 10,196,988 B2 | 2/2019 | Farnum et al. |
| 2004/0114666 A1 * | 6/2004 | Hardwicke .............. G01K 7/02 374/E7.004 |
| 2005/0198967 A1 * | 9/2005 | Subramanian .......... C23C 24/04 60/803 |
| 2012/0197597 A1 | 8/2012 | Mitchell |
| 2012/0227389 A1 | 9/2012 | Hinderks |
| 2013/0280044 A1 | 10/2013 | Kulkarni et al. |
| 2015/0159509 A1 | 6/2015 | Scipio et al. |
| 2015/0159558 A1 | 6/2015 | Scipio et al. |
| 2016/0076455 A1 | 3/2016 | Ekanayake et al. |
| 2016/0076458 A1 | 3/2016 | Ekanayake et al. |

FOREIGN PATENT DOCUMENTS

| | | |
|---|---|---|
| EP | 2529085 | 3/2018 |
| KR | 20110077631 A | 7/2011 |

\* cited by examiner

*Primary Examiner* — J. Todd Newton
(74) *Attorney, Agent, or Firm* — Procopio, Cory, Hargreaves & Savitch LLP

(57) ABSTRACT

A contamination sensor for a gas turbine engine is disclosed herein. The contamination sensor is made of a selected composition of material and includes a base alloy, an alloy for improving oxide formation, and at least one element from the transition metal group. The composition of the contamination sensor can be adjusted to react with specific contaminants at specific temperature ranges.

18 Claims, 4 Drawing Sheets

CONTAMINATION SENSOR FOR GAS TURBINE ENGINES

TECHNICAL FIELD

The present disclosure generally pertains to gas turbine engines. More particularly this application is directed toward a contamination sensor for gas turbine engines.

BACKGROUND

A gas turbine is a rotary power machine that uses air flowing continuously as a working medium and that converts thermal energy to mechanical work. The gas turbine generally includes three main components: a compressor, a combustor, and a turbine. At work, the compressor inhales air from an external atmosphere environment, and compresses the air by using an axial-flow compressor to increase pressure of the air, where at the same time, the temperature of the air also increases correspondingly. The compressed air is pressurized into the combustor and a mixture of the air and injected fuel burns to generate high temperature and high pressure gas. Then, the high temperature and high pressure gas enters the turbine and then does work by way of expansion, to push the turbine to drive the compressor and an externally loaded rotor to rotate together at a high speed, so that mechanical energy of gaseous or fluid fuel is partially converted to mechanical work, and electric work is output.

To improve reliability and optimize the life cycle cost of the turbine, the operating environment within the turbine can be monitored to detect possible contaminants. However the implementation of data transmission and power supply of contamination sensors may lead to increased costs and decreased structural integrity of turbine components.

U.S. Pat. No. 8,589,087 to Martin describes systems, methods, and an apparatus for monitoring corrosion or corrosive contaminants associated with liquid fuel. The method is provided for monitoring and predicting corrosion. The method can include monitoring corrosion or corrosive contaminants associated with liquid fuel in a fuel supply system of a gas turbine, predicting, based at least in part on the monitoring, a cumulative level of corrosion of one or more components associated with a gas turbine, and outputting information associated with the monitoring.

The present disclosure is directed toward improvements in the art.

SUMMARY

A contamination sensor for gas turbine engines is disclosed herein. The contamination sensor comprising a base material, an oxide former, and an element. The base material chosen from the group consisting of a nickel-based alloy and a cobalt based alloy The oxide former chosen from the group consisting of aluminum, titanium, and tantalum. The at least one element selected from the transition metal group.

BRIEF DESCRIPTION OF THE FIGURES

The details of embodiments of the present disclosure, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

Figure 1:
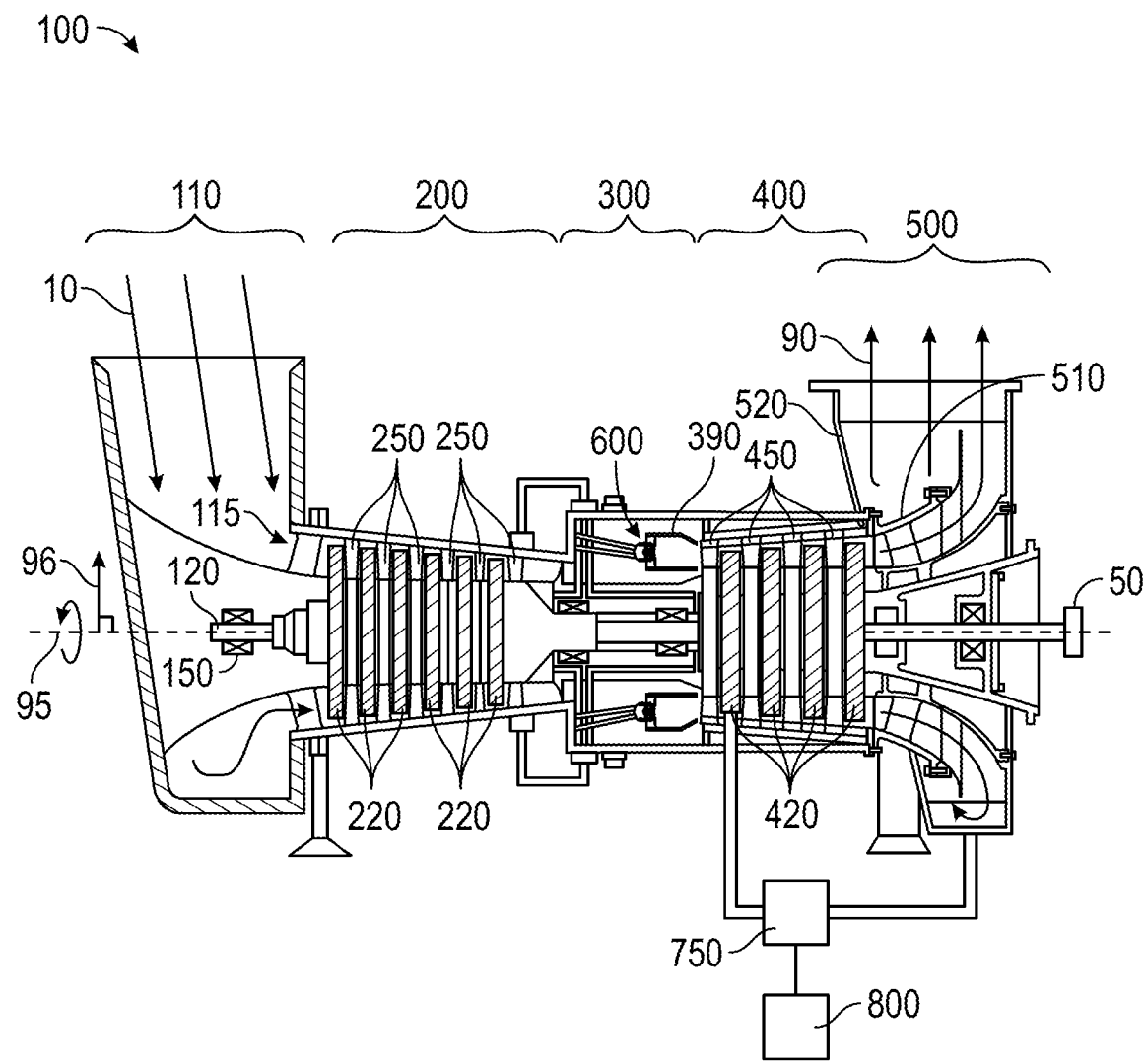
FIG. 1 is a schematic illustration of an exemplary gas turbine engine.

FIG. 1 is a schematic illustration of an exemplary gas turbine engine. Some of the surfaces have been left out or exaggerated for clarity and ease of explanation. Also, the disclosure may reference a forward and an aft direction. Generally, all references to "forward" and "aft" are associated with the flow direction of primary air (i.e., air used in the combustion process), unless specified otherwise. For example, forward is "upstream" relative to primary air flow, and aft is "downstream" relative to primary air flow.

In addition, the disclosure may generally reference a center axis 95 of rotation of the gas turbine engine, which may be generally defined by the longitudinal axis of its shaft 120 (supported by a plurality of bearing assemblies 150). The center axis 95 may be common to or shared with various other engine concentric components. All references to radial, axial, and circumferential directions and measures refer to center axis 95, unless specified otherwise, and terms such as "inner" and "outer" generally indicate a lesser or greater radial distance from, wherein a radial 96 may be in any direction perpendicular and radiating outward from center axis 95.

A gas turbine engine 100 includes an inlet 110, a gas producer or compressor 200, a combustor 300, a turbine 400, an exhaust 500, and a power output coupling 50. The compressor 200 includes one or more compressor rotor assemblies 220. The combustor 300 includes one or more injectors 600 and includes one or more combustion chambers 390. The turbine 400 includes one or more turbine rotor assemblies 420. The exhaust 500 includes an exhaust diffuser 510 and an exhaust collector 520.

As illustrated, both compressor rotor assembly 220 and turbine rotor assembly 420 are axial flow rotor assemblies, where each rotor assembly includes a rotor disk that is circumferentially populated with a plurality of airfoils ("rotor blades"). When installed, the rotor blades associated with one rotor disk are axially separated from the rotor blades associated with an adjacent disk by stationary vanes 250 and 450 ("stator vanes" or "stators") circumferentially distributed in an annular casing.

A gas (typically air 10) enters the inlet 110 as a "working fluid", and is compressed by the compressor 200. In the compressor 200, the air 10 is compressed in an annular flow path 115 by the series of compressor rotor assemblies 220. In particular, the air 10 is compressed in numbered "stages", the stages being associated with each compressor rotor assembly 220. For example, "4th stage air" may be associated with the 4th compressor rotor assembly 220 in the downstream or "aft" direction—going from the inlet 110 towards the exhaust 500). Likewise, each turbine rotor assembly 420 may be associated with a numbered stage. For example, first stage turbine rotor assembly is the forward most of the turbine rotor assemblies 420. However, other numbering/naming conventions may also be used.

Once compressed air 10 leaves the compressor 200, it enters the combustor 300, where it is diffused and fuel is added. Air 10 and fuel are injected into the combustion chamber 390 via injector 600 and ignited. After the combustion reaction, energy is then extracted from the combusted fuel/air mixture via the turbine 400 by each stage of the series of turbine rotor assemblies 420. Exhaust gas 90 may then be diffused in exhaust diffuser 510 and collected, redirected, and exit the system via an exhaust collector 520. Exhaust gas 90 may also be further processed (e.g., to reduce harmful emissions, and/or to recover heat from the exhaust gas 90).

The gas turbine engine 100 can include a sensor assembly 750 and a computer system 800 positioned outside of the housing of the gas turbine engine 100. In other examples, the sensor assembly 750 or a portion of the sensor assembly 750 can be positioned within the housing such as within the turbine 400.

The sensor assembly 750 can be in fluid communication with the turbine 400 via piping, tubing, or other conduit that provides access of gases within the turbine 400 to the sensor assembly 750. The exhaust 500 can be in fluid communication with the sensor assembly 750 via piping, tubing, or other conduit that provides transport of gases from the sensor assembly 750 to the exhaust 500.

The sensor assembly 750 can be in electrical communication with the computer system 800. The sensor assembly 750 and the computer system 800 are discussed further in FIG. 4.

One or more of the above components (or their subcomponents) may be made from stainless steel and/or durable, high temperature materials known as "superalloys". A superalloy, or high-performance alloy, is an alloy that exhibits excellent mechanical strength and creep resistance at high temperatures, good surface stability, and corrosion and oxidation resistance. Superalloys may include materials such as HASTELLOY, INCONEL, WASPALOY, RENE alloys, HAYNES alloys, INCOLOY, MP98T, TMS alloys, and CMSX single crystal alloys.

Figure 2:
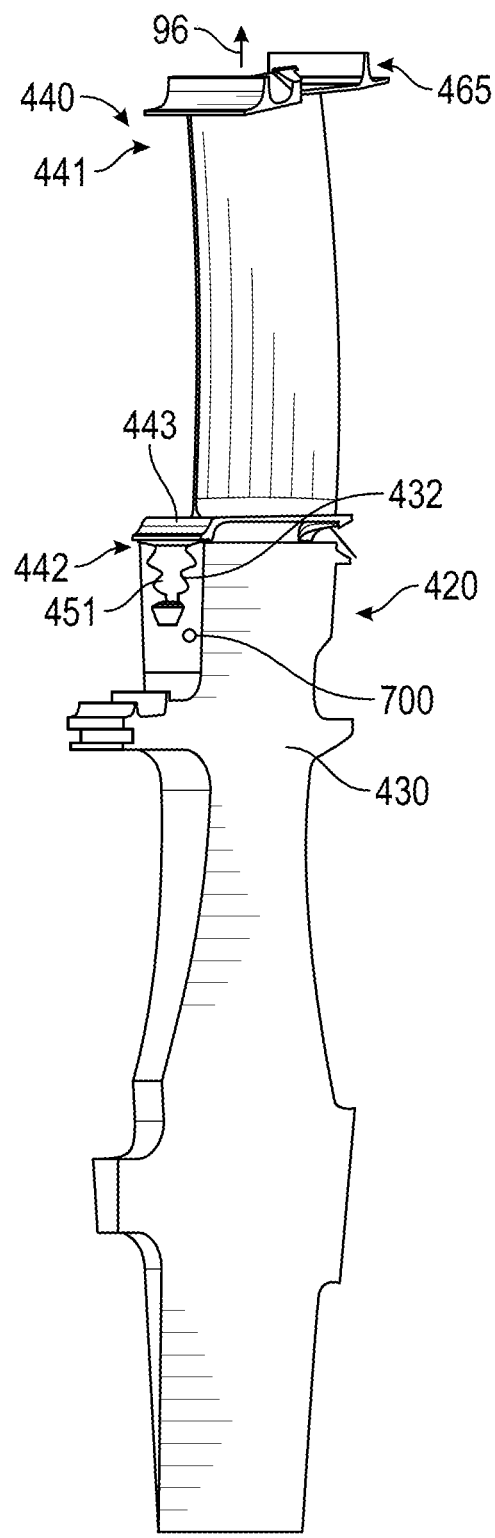
FIG. 2 is a cross-section view of a portion of the exemplary turbine rotor assembly from FIG. 1.

FIG. 2 is a cross-section view of a portion of the exemplary turbine rotor assembly from FIG. 1. In particular, a portion of the turbine rotor assembly 420 schematically illustrated in FIG. 1 is shown here in greater detail, but in isolation from the rest of gas turbine engine 100. The portion of the turbine rotor assembly 420 shown in FIG. 2 includes a portion or slice of a turbine rotor disk 430 cross sectioned on both sides corresponding approximately to the area under a turbine blade 440. The turbine blade 440 may include a base 442 including a platform 443 and a blade root 451. For example, the blade root 451 may incorporate "fir tree", "bulb", or "dove tail" roots, to list a few. Correspondingly, the turbine rotor disk 430 may include a circumferentially distributed slot or blade attachment groove 432 configured to receive and retain the turbine blade 440. In particular, the blade attachment groove 432 may be configured to mate with the blade root 451, both having a reciprocal shape with each other. In addition the blade root 451 may be slidably engaged with the blade attachment groove 432, for example, in a forward-to-aft direction.

The turbine blade 440 may further include an airfoil 441 extending radially outward from the platform 443 and away from the turbine rotor disk 430. The airfoil 441 may have a complex, geometry that varies radially. For example the cross section of the airfoil 441 may lengthen, thicken, twist, and/or change shape as it radially approaches the platform 443 inward from an upper shroud 465. The overall shape of airfoil 441 may also vary from application to application.

In an embodiment, the gas turbine engine 100 can include a contamination sensor 700 that can be affixed to the turbine rotor disk 430 proximate to the blade root 451. In examples, the contamination sensor 700 can be located at various stages within the turbine 400. In other examples the contamination sensor 700 can be located in other areas of the gas turbine engine 100.

Figure 3:
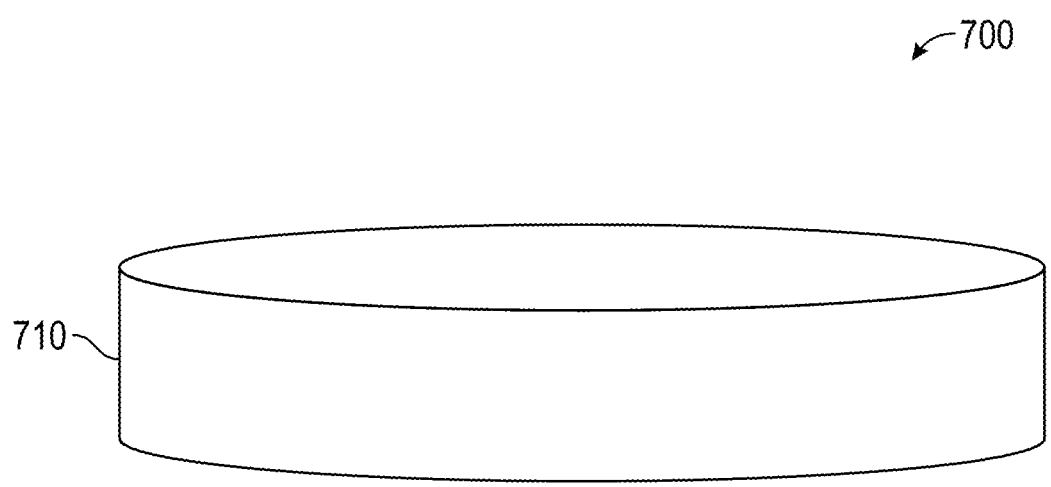
FIG. 3 is a perspective view of the exemplary contamination sensor from FIG. 2.

FIG. 3 is a perspective view of the exemplary contamination sensor from FIG. 2. The composition of the contamination sensor 700 can include a variety of metals. The contamination sensor 700 can be composed of a base material that is a transition metal alloy such as a nickel based alloy or a cobalt based alloy. In an embodiment, the base material is an alloy based on a period 4 transition metal alloy. The amount of the base material makes up approximately 70% to 85% by weight of the composition of the contamination sensor. It should be noted that throughout the description, wherever reference is made to an approximate percentage, that exact percentage is also included. In an embodiment, the base material makes up approximately 82% by weight of the composition of the contamination sensor 700. In examples, the base material makes up less than 82% by weight of the contamination sensor 700. In other examples, the base material makes up more than 82% by weight of the contamination sensor 700.

The contamination sensor 700 can be composed of an oxide former that can be an element in the post transition metal group such as aluminum or the transition metal group such as Titanium and Tantalum. In an embodiment, the oxide former makes up approximately 5% to 10% by weight of the composition of the contamination sensor 700. In an embodiment, the oxide former makes up approximately 6% by weight of the composition of the contamination sensor 700. In examples, the oxide former makes up less than 6% by weight of the contamination sensor 700. In other examples, the oxide former makes up more than 6% by weight of the contamination sensor 700.

The contamination sensor 700 can be composed of an element in the transition metal group, such as at least one refractory element that is a transition metal such as molybdenum, tungsten, niobium, tantalum, rhenium, hafnium, ruthenium, manganese, and chromium. In examples, the refractory element can be a group 4, 5, 6, 7, or 8 transition metal. In examples, the refractory element can be a period 4, 5, or 6 transition metal. In an embodiment, the at least one refractory element makes up approximately 3% to 20% by weight of the composition of the contamination sensor 700. In an embodiment, the at least one refractory element makes up approximately 12% by weight of the contamination sensor 700. In examples, the at least one refractory element makes up less than 12% by weight of the contamination sensor 700. In other examples, the at least one refractory element makes up more than 12% by weight of the contamination sensor 700. In an embodiment, there are at least two one refractory elements.

In examples, the amount of chromium can be approximately 0% to 3% by weight of the composition of the contamination sensor 700 to adjust the sensitivity of the contamination sensor 700.

The use of different refractory elements can adjust the contamination sensor 700 sensitivity to contaminants at specific temperature ranges. In an example, the contamination sensor 700 can be composed of approximately 82% by weight of a cobalt based alloy, approximately 6% by weight of aluminum, approximately 6% by weight of tantalum, and approximately 6% by weight of molybdenum and can be sensitive to contaminants around 550 degrees C.

In another example the contamination sensor 700 can be composed of approximately 82% by weight of a nickel based alloy, approximately 6% by weight aluminum, approximately 6% by weight tantalum, and approximately 6% by weight tungsten and can be sensitive to contaminants around 650 degrees C.

In yet another example, with improved sensitivity, the contamination sensor 700 can be composed of approximately 76% by weight of a cobalt based alloy, approximately 6% by weight of aluminum, approximately 6% by weight of tantalum, and approximately 12% by weight of molybdenum.

The contamination sensor 700 can have a homogeneous composition to ensure a bulk response to present contaminants. The contamination sensor 700 can form an oxidation layer 710 around the outer surface of the contamination sensor 700 in the oxidizing environment. The oxidation layer 710 can be similar to an oxidation layer found on the other components of the gas turbine engine 100, such as the turbine blade 440 and the turbine disk 430.

Figure 4:
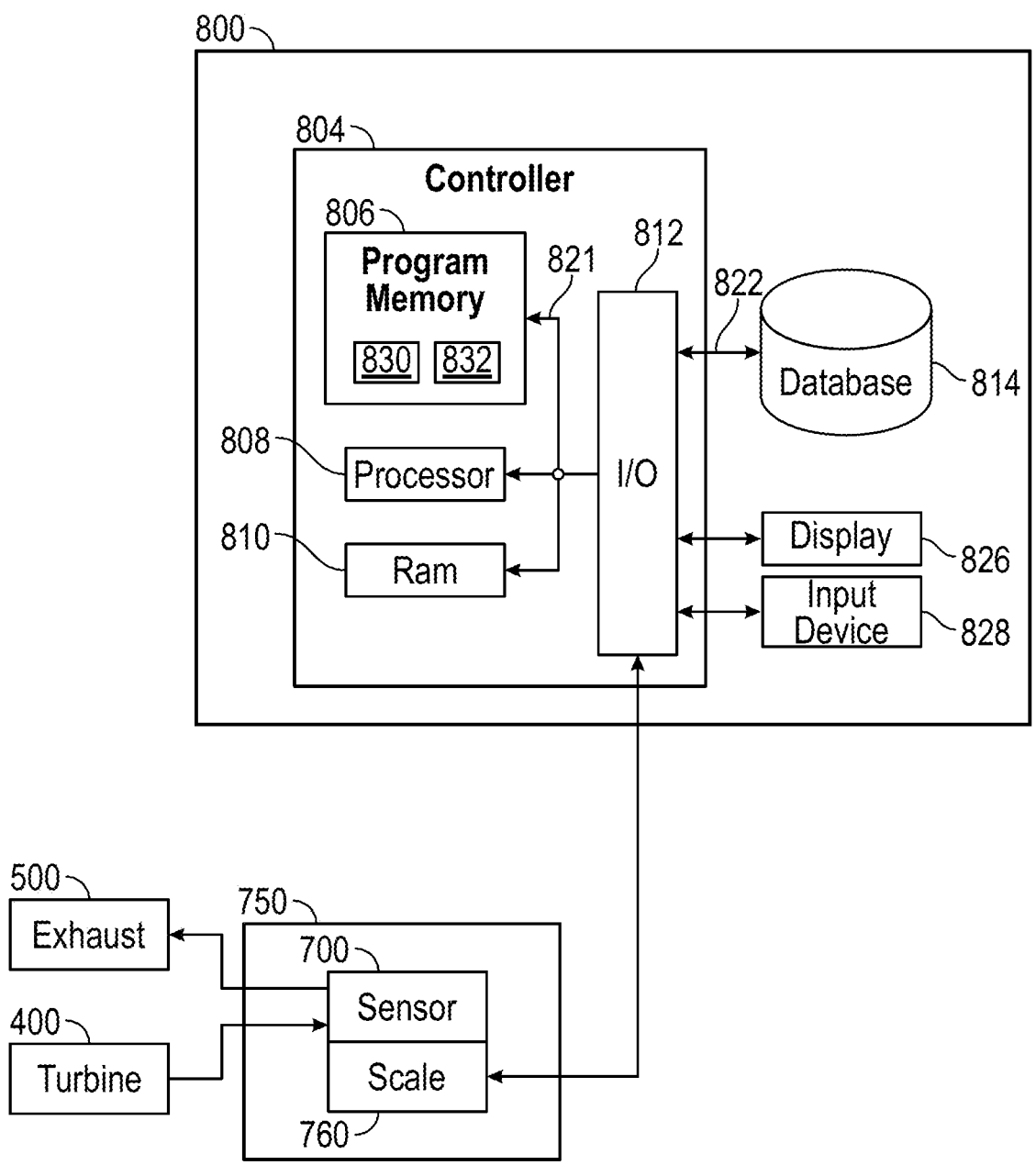
FIG. 4 is a functional block diagram of the sensor assembly and the computer system from FIG. 1.

FIG. 4 is a functional block diagram of the sensor assembly and the computer system from FIG. 1. The sensor assembly 750 can include the contamination sensor 700 (sometimes referred to as sensor) and a scale 760. The contamination sensor 700 can be in fluid communication with the turbine 400 and receive hot gas with contaminants during operation of the gas turbine engine 100. The contamination sensor 700 can be in fluid communication with the exhaust 500 and the hot gas with contaminants can be routed to the exhaust 500 after being in contact with the contamination sensor 700. The scale 760 can measure the weight and/or the weight change of the sensor 700. During operation of the gas turbine engine 100, contaminants within the hot gas from the turbine 400 can react with the sensor 700 and change the weight of the sensor 700. For example, contaminants from the gas within the turbine 400 react with the sensor 700 and increase the weight of the sensor over time.

In certain embodiments, the computer system 800 is in electrical communication with the sensor assembly 750. In an embodiment, the computer system 800 is in electrical communication with the scale 760. In other examples, the sensor assembly 750 has other components and the computer system 800 is in electrical communication with those other components.

The computer system 800 may have a controller 804 operatively connected to a database 814 via a link 822 connected to an input/output (I/O) circuit 812. It should be noted that, while not shown, additional databases 814 may be linked to the controller 804 in a known manner. Furthermore, these databases 814 may be external to the computer system 800.

The controller 804 can include a program memory 806, the processor 808 (may be called a microcontroller or a microprocessor), a random-access memory (RAM) 810, and the input/output (I/O) circuit 812, all of which are interconnected via an address/data bus 821. It should be appreciated that although only one microprocessor 808 is shown, the controller 804 may include multiple microprocessors 808. Similarly, the memory of the controller 804 may include multiple RAMs 810 and multiple program memories 806. Although the I/O circuit 812 is shown as a single block, it should be appreciated that the I/O circuit 812 may include a number of different types of I/O circuits. The RAM(s) 810 and the program memories 806 may be implemented as semiconductor memories, magnetically readable memories, nonvolatile memories, and/or optically readable memories, for example.

The program memory 806 and RAM 810 can be a non-transitory computer-readable medium having stored thereon computer-executable code (e.g., disclosed software or subroutines) and/or data. The program memory 806 and/or the RAM 810 may store various applications (i.e., machine readable instructions) for execution by the microprocessor 808. For example, an operating system 830 may generally control the operation of the computer system 800 and provide a computing environment to implement the processes described herein. The program memory 806 and/or the RAM 810 may also store a variety of software 832 for accessing specific functions of the computer system 800. In addition to the controller 804, the computer system 800 may include other hardware resources. The computer system 800 may also include various types of input/output hardware such as the visual display 826 and input device(s) 828 (e.g., keypad, keyboard, mouse, etc.). In an embodiment, the display 826 can be touch-sensitive, and may cooperate with a software keyboard routine as part of the software 832 to accept user input. The software 832 may implement other functions, for example, implementing software keyboard functionality, interfacing with other hardware in the computer system 800, etc.

The display 826 can display user input fields through a graphical user interface. The input fields of the graphical user interface can accept information related to deposit dimensions and other information inputted by a user interacting with the input device 828.

The software 832 may include code to execute any of the operations described herein. The program memory 806 and/or the RAM 810 may further store data related to the configuration and/or operation of the computer system 800, and/or related to the operation of the software 832.

INDUSTRIAL APPLICABILITY

The present disclosure generally applies to a contamination sensor 700 for gas turbine engines 100. The described embodiments are not limited to use in conjunction with a particular type of gas turbine engine 100, but rather may be applied to stationary or motive gas turbine engines, or any variant thereof. Gas turbine engines, and thus their components, may be suited for any number of industrial applications, such as, but not limited to, various aspects of the oil and natural gas industry (including transmission, gathering, storage, withdrawal, and lifting of oil and natural gas), power generation industry, cogeneration, aerospace and transportation industry, to name a few examples.

Generally, embodiments of the presently disclosed contamination sensor 700 are applicable to the use, assembly, manufacture, operation, maintenance, repair, and improvement of gas turbine engines 100, and may be used in order to improve performance and efficiency, decrease maintenance and repair, and/or lower costs. In addition, embodiments of the presently disclosed contamination sensor 700 may be applicable at any stage of the gas turbine engine's 100 life, from design to prototyping and first manufacture, and onward to end of life. Accordingly, the contamination sensor 700 may be used in a first product, as a retrofit or enhancement to an existing gas turbine engine, as a preventative measure, or even in response to an event.

Gas turbine engines 100 ingest air and burn it with gaseous or liquid fuels. Unfortunately, air and/or fuel containing small amounts of contaminants can cause significant environmental damage to the rotating components in gas turbine engine 100. In gas fuel powered gas turbine engines 100, these contaminants can include Sulphur containing of compounds such as $SO_2$, $SO_3$, $H_2S$, sulphate salts such as $Na_2SO_4$, $K2SO_4$, $CaSO_4$, $MgSO_4$, chloride salts such as NaCl, KCl, $MgCl_2$, and other contaminants.

For the compressor 200, such air-ingested salt contaminants can cause seizing of the variable guide vanes or can damage the rotating blades, resulting in lower efficiency and potential gas turbine engine shut-down in the event of component failure.

In the turbine 400, aforementioned contaminants have the potential to deposit at the surface of the turbine blades 440 (typically made of nickel or cobalt-based single crystal superalloys) or the turbine disk 430 (typically made of nickel-based superalloys) resulting in pit formation and crack initiation. Due to large stresses experienced by the attachment regions of the turbine blade 440 to the disk 430, a life-limiting crack can initiate and grow leading to catastrophic failure of turbine blade 440 or disk 430. This failure will, for aero-gas turbine engines cause an in-flight-shut-down, or for land-based gas turbine engines, cause downtime, both of which are expensive and undesirable.

A contamination sensor 700, or multiple sensors, can be installed within the gas turbine engine 100 to measure the presence and magnitude of contaminants. The contamination sensor 700 can have a homogenous composition. The contamination sensor 700 can be manufactured by combining the desired amounts of raw materials and melting them together. The raw material can be melted, for example, in a vacuum arc melter. The melted material of the contamination sensor 700 can undergo a heat treatment to further promote homogenization and to create an oxidation layer. For example, the heat treatment can be performed at high enough temperature to ensure diffusion, but low enough to avoid liquid formation.

When contaminants deposit at the surface of the contamination sensor(s) 700, the contaminants will break preexisting protective oxide and react with the sensor material, causing measurable material loss. The change in surface roughness of the contamination sensor 700, or the change in dimension, can be detected during periodic maintenance. For example, contamination sensor 700 can be installed in a region accessible to inspection with a borescope or other optical means and a region that is of relevance with respect to gas composition and temperature, such as relevant to the component part prone to failure. In an example, the contamination sensor 700 is secured to a location that is accessible by a technician. When the gas turbine engine 100 is stopped after operation, the contamination sensor 700 can be retrieved and weighed. The mass change of the contamination sensor can be translated into as a measurement of corrosive contaminants ingested by the gas turbine engine 100. The contamination sensor 700 can be replaced or re-installed depending on its remaining sensitivity.

The contamination sensor 700 can be used in a sensor assembly 750 to detect instantaneous contaminant ingress for online monitoring. This continuous measurement can enable mitigation strategies such as changing the intended gas turbine engine operation profile to avoid salt condensation on relevant surfaces. In an embodiment the continuous measurements are performed by measuring the weight/weight change of the contamination sensor 700. In an example, the continuous measurement can be used to alert a user for further inspection.

The contamination sensor temperature range and its contaminant sensitivity are tuned by modifying the material composition of the contamination sensor 700. The contamination sensor temperature range and its contaminant sensitivity may also be the contamination sensor's shape, stress, and overall arrangement.

For example, the contamination sensor 700 can be designed to have a high surface area to volume ratio with complex shapes and tunable alloy microstructure and porosity. This can be achieved via additive manufacturing, sometimes referred to as 3D printing.

Introducing a known stress to the contamination sensor 700 can increase the sensitivity of the contamination sensor 700. This can be done via mechanical (i.e., via a substrate misfit, or pre-torque) or via thermal gradient. Von Mises stress can have a strong effect on component damage due to hot corrosion assisted crack initiation resulting from reaction of aforementioned contaminants.

The overall arrangement of the contamination sensor(s) 700 such as an array with small dots of contamination sensors 700 of varying composition, or with changing environment conditions (temperature gradient for example) can provide measurements across a wide range of conditions.

Although this invention has been shown and described with respect to detailed embodiments thereof, it will be understood by those skilled in the art that various changes in form and detail thereof may be made without departing from the spirit and scope of the claimed invention. Accordingly, the preceding detailed description is merely exemplary in nature and is not intended to limit the invention or the application and uses of the invention. In particular, the described embodiments are not limited to use in conjunction with a particular type of gas turbine engine. For example, the described embodiments may be applied to stationary or motive gas turbine engines, or any variant thereof. Furthermore, there is no intention to be bound by any theory presented in any preceding section. It is also understood that the illustrations may include exaggerated dimensions and graphical representations to better illustrate the referenced items shown, and are not considered limiting unless expressly stated as such.

What is claimed is:

1. A contamination sensor for a gas turbine engine, the contamination sensor comprising:
    a base material chosen from the group consisting of a nickel based alloy and a cobalt based alloy;
    an oxide former chosen from the group consisting of aluminum, titanium, and tantalum;
    at least one element chosen from the group consisting of molybdenum, tungsten, niobium, tantalum, rhenium, hafnium, ruthenium, manganese, and chromium; and
    the contamination sensor has an outer surface and an oxide layer around the outer surface.

2. The contamination sensor of claim 1, wherein the base material is larger by weight than the amount of the oxide former and the amount of the at least one element combined.

3. The contamination sensor of claim 2, wherein the oxide former is 5% to 10% by weight of the contamination sensor.

4. The contamination sensor of claim 3, wherein the base material is 70% to 85% by weight of the contamination sensor.

5. The contamination sensor of claim 4, wherein the at least one element is more by weight than the amount of the oxide former.

6. The contamination sensor of claim 4, wherein the contamination sensor includes at least two elements from the transition metal group.

7. The contamination sensor of claim 1, wherein the contamination sensor is homogeneous.

8. The contamination sensor of claim 1, wherein the at least one element is 3% to 20% by weight of the contamination sensor.

9. A contamination sensor composition effective for sensing a corrosive contaminant within a gas turbine engine, the contamination sensor composition comprising:
- a base material chosen from the group consisting of a nickel based alloy and a cobalt based alloy;
- an oxide former chosen from the group consisting of aluminum, titanium, and tantalum;
- at least one refractory element, the refractory element chosen from the group consisting of molybdenum, tungsten, niobium, tantalum, rhenium, hafnium, ruthenium, and chromium; and
- wherein the contamination sensor has a homogeneous composition.

10. The contamination sensor composition of claim 9, wherein the contamination sensor includes an oxide layer around its outer surface.

11. The contamination sensor composition of claim 10, wherein the amount of oxide former is substantially equal to or more than 5% by weight of the contamination sensor composition.

12. The contamination sensor composition of claim 11, wherein the amount of the base material is substantially equal to or less than 85% by weight of the contamination sensor composition.

13. The contamination sensor composition of claim 12, wherein the amount of the at least one refractory element is more by weight than the amount of the oxide former.

14. The contamination sensor composition of claim 12, wherein the contamination sensor includes at least two refractory elements.

15. The contamination sensor composition of claim 9, wherein the amount of the base material is larger by weight than the amount of oxide former and the amount of the at least one refractory element combined.

16. A contamination sensor composition effective for sensing a corrosive one or more contaminants within a gas turbine engine, the contamination sensor composition comprising:
- a base material chosen from the group consisting of a nickel based alloy and a cobalt based alloy, the amount of base material 70% to 85% by weight of the contamination sensor composition;
- an oxide former chosen from the group consisting of aluminum, titanium, and tantalum, the amount of oxide former 5% to 10% by weight of the contamination sensor composition; and
- at least one element chosen from the group consisting of molybdenum, tungsten, niobium, tantalum, rhenium, hafnium, ruthenium, manganese, and chromium, the amount of the at least one element 3% to 20% by weight of the contamination sensor composition.

17. The contamination sensor composition of claim 16, wherein the amount of the base material is larger by weight than the amount of aluminum and the amount of the at least one refractory element combined.

18. The contamination sensor composition of claim 16, wherein the contamination sensor includes at least two elements from the transition metal group.

* * * * *